Sept. 1, 1936. W. L. FLEISHER Re. 20,088
VENTILATING SYSTEM
Original Filed May 20, 1927
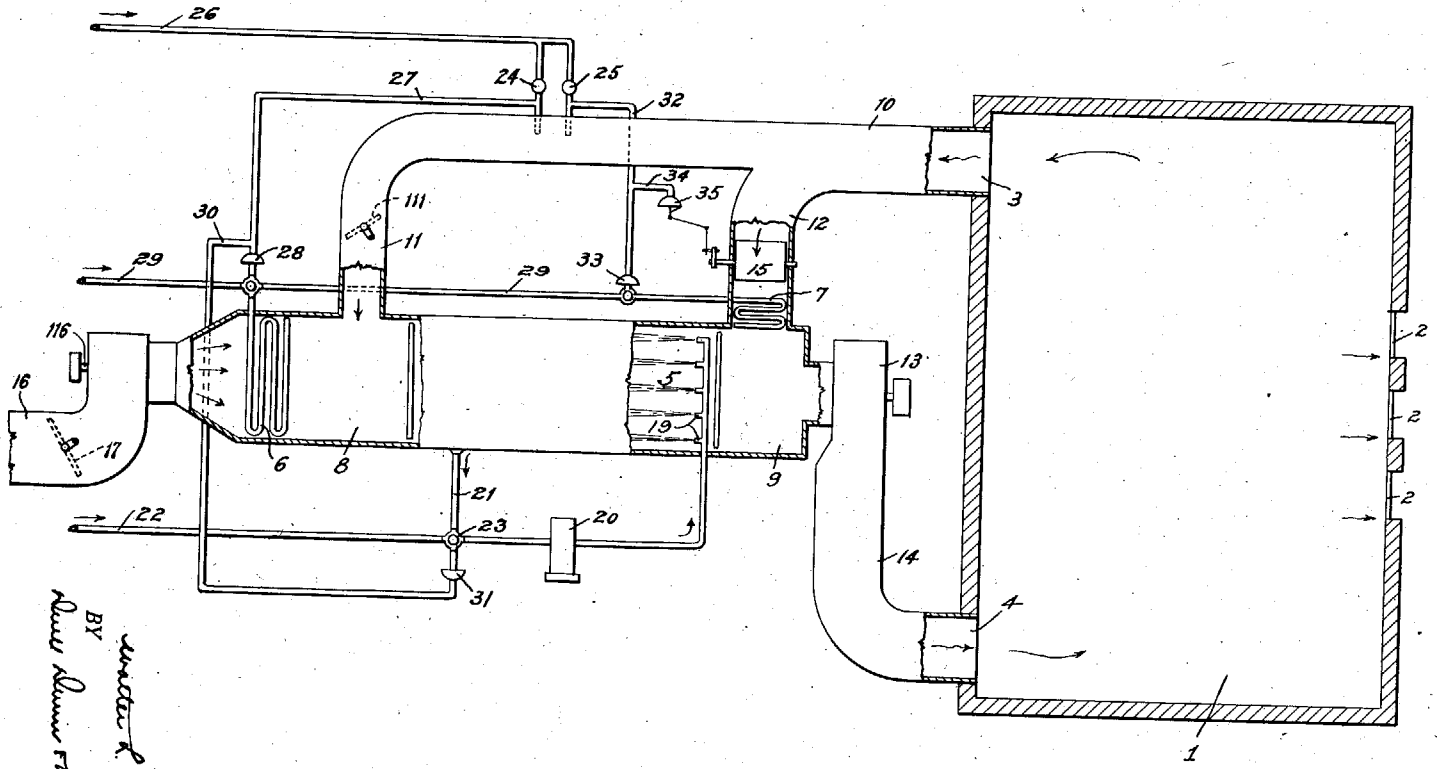
INVENTOR.
Walter L. Fleisher
BY
Dunn Dunn & Anderson
ATTORNEYS.

Reissued Sept. 1, 1936

Re. 20,088

UNITED STATES PATENT OFFICE 20,088

VENTILATING SYSTEM

Walter L. Fleisher, New City, N. Y., assignor, by mesne assignments, to Auditorium Conditioning Corporation, a corporation of New Jersey Original No. 1,670,656, dated May 22, 1928, Serial No. 192,898, May 20, 1927. Application for reissue June 1, 1936, Serial No. 82,993

25 Claims. (Cl. 236—44)

This invention relates to air conditioning apparatus and more particularly to systems intended to maintain desirable conditions within a public enclosure. In the ventilation of buildings it has been found that the comfort of the occupants is dependent not only upon the temperature, humidity, and purity of the air, but also upon air movement, this latter playing its part not only in its direct effect upon the occupants, but also in its services in maintaining a proper distribution of suitable air throughout the enclosure.

It is also desirable that there shall not be too great a difference in temperature between incoming air and the air in the room itself.

The problem of ventilating public enclosures, particularly theatres, is primarily a cooling and de-humidifying one, both winter and summer. In the winter time the natural dry outside air assists in this, but in the summer time the effect is opposite; in either instance, the outer air may differ very widely, both in temperature and moisture content from that desired in the room.

On the other hand, the air within the room, with an automatic system of control, is fairly constant, in both respects; and is quite close to the condition desired. Great economies may be thus effected by utilizing, insofar as possible, air coming from the room itself rather than outside air. This withdrawn or recirculated air is preferably used for two purposes. First, because of its close approximation to the standard desired, it may be used in part at least, as the air to be conditioned intensively to restore the room conditions. Second, it may be used to increase the volume of circulating air and to dilute the intensively conditioned air so that it shall not differ too much either in temperature or humidity from the standard to be maintained.

It is an object of the present invention to provide a system which will accurately control and maintain the predetermined conditions within the room and which will employ a minimum of power and which will operate satisfactorily under widely varying conditions of outside air and in spite of wide changes of heat and moisture given off within the room.

For a fuller understanding of the nature and objects of the invention, reference should be had to the following detailed description taken in connection with the accompanying drawing, which is a diagrammatic representation of a system embodying important features of my invention.

In the drawing the numeral 1 represents a room or building to be ventilated, having diagrammatically represented at 2 the customary windows and doors. Suitable outlets and inlets 3 and 4 are provided, and means are provided for withdrawing air from the outlets and back in through the inlets. In practice there will be, generally, a plurality of both inlets and outlets, properly distributed throughout the building and it is to be understood in the present invention, that a proper and suitable distribution will be employed. Only one inlet and one outlet have been shown in the drawing, as the specific distribution does not form a part of this invention.

Where a conditioning problem is primarily a dehumidifying one, and the dehumidification is to be effected by refrigeration, it is more economical intensively to dehumidify a small body of air than extract the same quantity of moisture from a larger body. Moreover, the effect of refrigeration can be most efficiently produced upon air within the temperature limits involved in ventilation, by bringing such bodies of air into direct contact in the form of a spray. The particular embodiment of the invention herein illustrated, therefore, embraces this principle of dehumidification.

Thus, as shown, conditioning apparatus comprises, generally, a washer 5, connected with heaters 6 and 7, and mixing chambers 8 and 9. The term conditioning apparatus will be used herein to refer to the washing apparatus, as it is well understood that the washer not only purifies the air, but is also used to dry or humidify the air, dependent upon the temperature of the wash water employed and the condition of the air to be washed. The exhaust air from the outlet 3 is carried by a conduit 10 having two branches, one of which, 11, leads to the mixing chamber 8 at one side of the conditioning apparatus, while the other branch 12 leads to the other mixing chamber 9 at the other side of the conditioning apparatus. The mixing chambers 8 and 9 are in direct communication with the conditioning apparatus and a fan 13 is arranged to withdraw air from the mixing chamber 9 and return it through a conduit 14 to be discharged into the building through the inlet 4. With the above arrangement the fan 13 may withdraw air through the conduit 12 and mixing chamber 9, to be directly recirculated into the building, or it may draw air through the conduit 11 through the mixing chamber 8, the conditioning apparatus and mixing chamber 9, to be again sent into the building, the conduit 12 thus constituting a short circuit or by-pass around the washing apparatus. A damper 15 is arranged to control the passage of air through this short circuit and thus to determine the proportion which the conditioned air bears to the withdrawn air with which it is diluted, thus determining what proportion of the circulated air shall be treated. Means are provided for admitting fresh air to the system, comprising a fresh air inlet 16 in communication with the mixing chamber 8.

The above system is particularly applicable to a plenum ventilation, that is, to a ventilation system in which the air within the building is maintained at slightly greater pressure than the outside air, in order that any filtration through cracks in the building or around the windows may be outward and thus without annoyance to the occupants. And thus while special exhausts may be provided, if desired, it will generally be found, with the ordinary building construction, the air lost to the system through such filtration when added to the air forcibly exhausted from smoking rooms and toilet rooms, is sufficient to afford ample air renewal without the necessity of providing special conduits for the discharge of air from the system. Thus the fresh air admitted from the conduit 16 will obviously replace the air discharged from the system in this manner. A damper 17 in the fresh air conduit 16 controls the inlet of fresh air and hence indirectly controls the quantity of air which is discharged from the system by controlling the relation between the pressure within the room and the outside pressure. A corresponding damper 111 in the conduit 11 may be used to reduce the quantity of recirculated air through the conditioning apparatus, whenever required. Thus, by closing the damper 17 when desirable, the system may be used as a completely closed system, using and re-using, over and over, the same air, this being feasible because of the fact that the conditioning system automatically controls the humidity and removes impurities. On the other hand, if the damper 17 be opened fully, a large quantity of fresh air will be admitted to the system. A blower 116 may be provided in the fresh air intake to still further increase the fresh air admitted to the system in case it is desired. Such a blower may be found especially useful if the ducts supplying the fresh air be long or otherwise offer undue resistance to the air passage, or if for any other reason it be desired to increase the plenum within the enclosure. Ordinarily it is desirable to circulate through the room about three parts of recirculated air to each part of fresh air, as in this manner a satisfactory circulation may be maintained without undue cost for conditioning outside air.

The conditioning apparatus in the form illustrated comprises, generally, a plurality of sprays 19, through which water is forced by a pump 20. Provision is made whereby the water for the sprays may either be withdrawn from the spray chamber through a conduit 21 for recirculation, or may be obtained from a refrigerated source 22. A valve 23 is arranged to change the connection from the one to the other. Control of humidity by subjecting air to cooling reduces the air to a dew point temperature generally below that required for ventilation. Some means should be provided, therefore, to raise the temperature above the dew point by adding a quantity of heat, which may conveniently be referred to as superheat, and for controlling the quantity of superheat thus added. Since the returned air is generally above its dew point and therefore contains superheat, this may conveniently be done by controlling the quantity of returned air which is mixed with the conditioned air. Under many conditions, however, the returned air will itself carry so much moisture as to render the latent heat out of proportion to the superheat, so that some additional means should be provided for adding superheat directly when required. The heater 7 will be employed whenever the air return is insufficient to furnish the quantity of superheat desired. This heater may be at any place where its heat will be added to the mixture of return and conditioned air. It is convenient, however, to place it in the short-circuit duct 12 admitting return air to the mixing chamber so that the air heated by it is thoroughly mingled with the conditioned air by passing through the fan.

The heater 6 within the fresh air conduit 16 tempers the incoming air, so that excessively cold air will not interfere with the conditioning operations. It is a characteristic of a washing apparatus in which all or a large proportion of the water is recirculated, that it reduces the air to the wet bulb temperature of the incoming air. If, for example, the incoming air has a dry bulb temperature of thirty-five and a humidity of 50%, it will have a wet bulb temperature of 30 degrees. If this air be then heated to 80 degrees, dry bulb temperature, its wet bulb temperature will be 52 degrees instead of 30. The heater thus serves to control the wet bulb temperature within the washing apparatus. The example just given of course relates to a condition in which all of the incoming air is heated and conditioned, but corresponding results occur where return air is mixed with the fresh air.

The conditions within the room are maintained automatically by control apparatus responsive to the air conditions. An effective method of doing this is to provide thermostats responsive to the air as it is withdrawn from the room. In the practical form illustrated there is provided in the exhaust air conduit a wet bulb thermostat 24 and a dry bulb thermostat 25, each controlling the flow of compressed air from a compressed air source 26 into the control apparatus. The compressed air conduit 27 from the wet bulb thermostat 24 communicates with a diaphragm motor 28 for controlling the flow of steam from a source 29 to the heater 6, and also through a conduit 30 to a diaphragm motor 31 for operating the valve 23. The compressed air conduit 32 from the dry bulb thermostat 25 communicates with a diaphragm motor 33 to control the flow of steam from source 29 to the heater 7, and also through the conduit 34 to a diaphragm motor 35 to operate the damper 15 through a suitable link motion, the connections being such that at a rising wet bulb temperature the steam is cut off from the coil 6 and the circulation of the pump 20 changes from the recirculated water to the refrigerated water by operation of the valve 23. On a rising wet bulb temperature the steam coil within the conduit is shut off and the flow of air through the conduit is controlled.

In general, the system may be operated in two different ways. For example, the dry bulb thermostat may be arranged to control the superheat by controlling the valve 15, opening the valve to the extent of a quantity of superheat that is required, and the control of the steam supply through the motor 33 may be arranged to be brought into effect only when the superheat added by the return air proves insufficient. Similarly the thermostat 24 and the motor 28 may be arranged to cut off the heater 6 at the valve 28 before moving the valve 23 to employ refrigerated water in the sprays. In general, in a system of this type, the heaters 6 and 7 will not be active during the summer months, so that during such months the superheat control is largely obtained through the operation of the valve 15, and the moisture content by variation of the valve 23, the former varying the proportions of return air which dilute the humidified air and the latter varying the dew point within the conditioning chamber.

In the foregoing system it will be clear that the conditioning may be accomplished with the minimum of power, since the maximum quantity of air may be by-passed without passing through the conditioning apparatus. At the same time, the heating is reduced to a minimum, since the great bulk of the air for ventilation is circulated through the system, thus making it unnecessary to heat large quantities of outside air or to raise the full volume of air from the dew point to the dry bulb temperature desired. Furthermore, the refrigeration of the cooling water is required for only a small portion of the air and hence the great bulk of the circulated air does not need to be relieved of its superheat only to be reheated again.

It will be seen, moreover, that the moisture content is directly controlled by wet bulb temperature control of the conditioning apparatus, while the superheat is directly controlled from the dry bulb temperature, and in so far as possible the control is effected by controlling the proportion of recirculated air and the use of refrigerants, and heat is required only when that control proves inadequate. It will thus be seen that a thorough and complete control of the room conditions is obtained with a minimum of power.

The damper 17 and the fan 116 may be automatically controlled to maintain a predetermined pressure in the room if desired.

Since certain changes in carrying out the above process and in the constructions set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. The process of ventilating and controlling the humidity and temperature of a room, which includes withdrawing air from the room, mixing fresh air with withdrawn air, dehumidifying said mixture by reducing the same to a desired dew point below that of the air in the room, adding to the dehumidified air withdrawn air containing super-heat, and adjusting responsive to air conditions in the room the proportions of dehumidified air and withdrawn air added thereto to maintain a desired humidity in the room.

2. The process of ventilating and controlling the humidity and temperature of a room, which includes withdrawing air from the room, mixing fresh air with a portion of the withdrawn air, controllably dehumidifying said mixture by reducing the same to a desired dew point and temperature below that of the air in the room, adding to the dehumidified air a second portion of the withdrawn air containing super-heat, and adjusting the proportions of dehumidified air and withdrawn air added thereto to automatically maintain a desired humidity in the room in accordance with the dry bulb temperature of the air in the room.

3. The process of ventilating and conditioning a room, which includes withdrawing air from the room, mixing fresh air with withdrawn air, bringing said mixture to a dew point and adjusting the temperature of the dew point in accordance with the wet bulb temperature in a room, mingling withdrawn air having a condition different from the conditioned air with said conditioned air in varying proportions and varying the proportions in accordance with the dry bulb temperature of the air in the room.

4. The process of ventilating and conditioning a room which includes withdrawing air from the room, mixing fresh air with withdrawn air, bringing said mixture to a dew point and adjusting the temperature of the dew point in accordance with the wet bulb temperature in the room, mingling withdrawn air having a condition different from the conditioned air with said conditioned air in varying proportions and varying the proportions in accordance with the dry bulb temperature of the air in the room and adding superheat before admitting said air to the room, and controlling said heat by the fall of the dry bulb temperature below a predetermined minimum.

5. The process of ventilating and conditioning a room which includes withdrawing air from the room, mixing fresh air with withdrawn air, bringing said mixture to a dew point with variable temperature and adjusting the temperature of the dew point in accordance with the wet bulb temperature in a room, mingling withdrawn air having a condition different from the conditioned air with said conditioned air in varying proportions and varying the proportions in accordance with the dry bulb temperature of the air in the room and heating the fresh air when the wet bulb temperature has fallen below a predetermined minimum.

6. In an apparatus for ventilating and conditioning a room, in combination, a conditioning apparatus, means for supplying water of a variable temperature to said conditioning apparatus, means for leading fresh air and air withdrawn from the room to said conditioning apparatus, a conduit for conducting air from the conditioning apparatus to the room, a by-pass conduit for conducting air having a condition different from the conditioned air to said inlet conduit, means for heating the fresh air admitted to the system, means for heating the exhaust air passing through said by-pass conduit, means responsive to the wet bulb temperature arranged to respond to a rising wet bulb temperature to first cut off the heating of the fresh air and subsequently to lower the temperature of the circulated water in the conditioning system and means responsive to the dry bulb temperature adapted, on rising dry bulb temperature, first to cut off the heating of the by-passed air and subsequently to reduce the air supply in the by-pass conduit.

7. A system for ventilating and conditioning a room comprising, in combination, a conditioning apparatus, means for controlling the temperature of the wash water fed to said apparatus to determine the dew point of the treated air, means for admitting fresh air and air withdrawn from the room to said conditioning apparatus, and means responsive to the wet bulb temperature of the withdrawn air for varying the temperature of the fresh air.

8. An apparatus for ventilating and conditioning a room comprising, in combination, an air conditioning apparatus, means for circulating air out of said room through said apparatus and into the room again, means for admitting fresh air to the system before passing through the conditioning apparatus, means for diluting the conditioned air, means responsive to the wet bulb temperature for varying the moisture carried in by the conditioned air, and means responsive to the dry bulb temperature for varying the superheat carried in by the diluting air.

9. In an apparatus of the character described, in combination, means for conditioning air, means for admitting fresh air and air withdrawn from the room to the conditioning apparatus, means for diluting the conditioned air and means responsive to the dry bulb temperature for varying the superheat added to the air by such dilution adapted, on a falling dry bulb temperature, first to increase the quantity of such diluting air and subsequently, on further falling, to increase the sensible heat thereof.

10. In an apparatus of the character described, in combination, a conditioning apparatus, means for admitting fresh and returned air to said conditioning apparatus, means for mingling withdrawn air with the conditioned air, means for admitting the mixture so formed to the building, means responsive to the wet bulb temperature for varying the quantity of latent heat in the mixture and means responsive to the dry bulb temperature for varying the quantity of superheat.

11. In an apparatus for conditioning a room, in combination, an air conditioning apparatus, means for feeding fresh air and air withdrawn from the room to the apparatus, and means for varying the dew point of the issuing air in accordance with the wet bulb temperature of the withdrawn air.

12. In an apparatus of the character described, in combination, means for feeding air to an enclosure, means for conditioning said air, means for supplying fresh air and return air for conditioning, means for diluting the conditioned air with recirculated air, and means responsive to the temperature within the room for varying the superheat carried in by the air entering the room.

13. In an apparatus of the character described for controlling atmospheric conditions in an enclosure, in combination, means for dehumidifying air, means for supplying fresh air and return air from the enclosure for dehumidifying, means whereby the dew point of the air passing through said dehumidifying means may be controlled, means for diluting the dehumidified air with recirculated air from the enclosure, means responsive to the temperature within the enclosure for varying the quantity and proportion of such recirculated air in the diluted air, and means for forcing said diluted air to the enclosure.

14. In an apparatus of the character described for controlling atmospheric conditions in an enclosure, in combination, means for dehumidifying air, means for supplying fresh air and return air from the enclosure for dehumidifying, means whereby the dew point of the air passing through said dehumidifying means may be controlled, means for diluting the dehumidified air with recirculated air from the enclosure, means responsive to the temperature of the enclosure for varying the quantity of such air returned for dehumidification, and means for forcing said diluted air to the enclosure.

15. In an apparatus of the character described for controlling atmospheric conditions in an enclosure, in combination, means for dehumidifying said air, means for supplying fresh air and return air from the enclosure for dehumidifying, means whereby the dew point of the air passing through said dehumidifying means may be controlled, means for diluting the dehumidified air with recirculated air from the enclosure, means responsive to the humidity of the air within the enclosure for varying the humidity of the air entering the enclosure to maintain a substantially constant humidity in the enclosure, and means for forcing said diluted air to the enclosure.

16. In an apparatus of the character described for controlling atmospheric conditions in an enclosure, in combination, means for dehumidifying air, means for supplying fresh air and return air from the enclosure for dehumidifying, means whereby the dew point of the air passing through said dehumidifying means may be controlled, means for diluting the dehumidified air with recirculated air from the enclosure, means responsive to the temperature of the enclosure for varying the quantity of the recirculated air used to dilute the dehumidified air, means responsive to the humidity of the enclosure for varying the quantity of moisture carried in by the air entering the enclosure to maintain a substantially constant moisture content in the enclosure, and means for forcing said diluted air to the enclosure.

17. The process of conditioning air in a room which includes withdrawing air therefrom, mixing fresh air with a part of the withdrawn air, dehumidifying the mixture of withdrawn and fresh air by reducing the same to a dew point below that of the air in the room, introducing unconditioned withdrawn air into the dehumidified mixture to form a diluted mixture, varying automatically the volume and proportion of such introduced air in the diluted mixture in accordance with the temperature of the room and discharging the complete mixture into the room.

18. In a ventilating and air conditioning system, dehumidifying apparatus, means whereby the dew point of the air passing through said apparatus may be controlled, an enclosure to be ventilated and air conditioned, means for supplying fresh air and air drawn from the enclosure to the dehumidifying apparatus, means, including a blower, for delivering said air, after dehumidification, from the apparatus to the enclosure, means for mixing unconditioned air with the dehumidified air prior to such delivery, said blower being located between the last mentioned means and the enclosure, and means for automatically regulating the proportions of dehumidified and unconditioned air mixed to obtain a desired condition of temperature and humidity in the enclosure.

19. In a ventilating system a conditioning device, an enclosure to be ventilated, an inlet to and an outlet from the conditioning device, first means for delivering air from the enclosure to the device to be conditioned and delivered at the outlet, second means for delivering air from the enclosure to a point adjacent the outlet to be mixed with the air delivered from the device, and means for automatically adjusting the dry and wet bulb temperatures of the mixture in accordance with desired conditions in the enclosure.

20. In a ventilating and air conditioning system, a dehumidifying device, means whereby the dew point of the air passing through said device may be controlled, an enclosure to be ventilated and air conditioned, means automatically controlled for delivering a portion of the air from the enclosure to the device for dehumidifying, and by-passing another portion thereof around said device, the by-passed air and the air from the dehumidifier being arranged to mix, and means including a blower for receiving the mixture and delivering the same to the enclosure in a condition determined by the condition of the air coming from the enclosure.

21. An apparatus for ventilating and conditioning a room comprising an air conditioning device using a refrigerant for determining the dew point of treated air, means for admitting fresh air and air withdrawn from the room to said conditioning device, and automatic means for controlling the temperature of the refrigerant used by the device.

22. The process of ventilating a room which comprises saturating a mixture of return and fresh air having a certain temperature, varying the temperature in accordance with the wet bulb temperature of the returned air, and automatically controlling the diluting of the mixture with returned air having a condition different from the mixture, to produce a desired dry bulb temperature.

23. In an apparatus of the character described, the combination, in series, of a conditioner provided with inlet means for fresh air and inlet means for return air, a mixing chamber connected to the outlet of the conditioner and having an inlet for recirculated air, a blower for delivering air from the mixing chamber to a room to be conditioned, the room being subjected to the introduction of heat and moisture in widely varying quantities, means associated with the conditioner for controllably fixing the dew point of the air passing therethrough lower than that in the room, and means for controlling, responsive to the temperature in the room, the quantities of fresh, return and recirculated air admitted through said respective inlets to maintain substantially constant the conditions of temperature and humidity in the room.

24. Apparatus of the character described, for maintaining both a desired temperature and a desired humidity of air in an enclosure, comprising in combination, a dehumidifier using a refrigerant for regulating the dew point of air, means for controlling the temperature of the refrigerant used in the dehumidifier, means for supplying fresh air and return air from the enclosure to said dehumidifier, means for diluting the air from the said dehumidifier with recirculated air from the enclosure, means responsive to the temperature within the enclosure for varying the relative quantity of such recirculated air in the diluted air, and means for forcing the diluted air to the enclosure.

25. In an apparatus of the character described, in combination, means for dehumidifying a portion of said air, means for supplying fresh air and return air from the enclosure for dehumidifying, means whereby the dew point of the air passing through said dehumidifying means may be controlled, means for diluting the dehumidified air with recirculated air from the enclosure, means responsive to the temperature within the enclosure for varying the quantity and proportion of such recirculated air in the diluted air, said last mentioned means also varying the quantity of the air returned for dehumidification, and means for forcing said diluted air to the enclosure.

WALTER L. FLEISHER.